United States Patent

Lansaque et al.

[15] 3,690,684
[45] Sept. 12, 1972

[54] GASKETS

[72] Inventors: Rene Lansaque, Meyzieu, Rhone; Georges Bonnefond, Tassin-la Demi-Lune, Rhone, both of France

[73] Assignee: Societe Chimique De Gerland, Lyon, Rhone, France

[22] Filed: Oct. 27, 1970

[21] Appl. No.: 84,314

[52] U.S. Cl............277/207, 277/DIG. 2, 285/DIG. 9
[51] Int. Cl. ...............................................F16j 15/10
[58] Field of Search....277/207, 207 A; 285/DIG. 19, 285/230, 231, 240, 245; 251/DIG. 1

[56] References Cited

FOREIGN PATENTS OR APPLICATIONS 6,410,255   3/1965   Netherlands...........277/207 A Primary Examiner—William F. O'Dea
Assistant Examiner—Robert I. Smith
Attorney—Karl F. Ross

[57] ABSTRACT

A gasket insertable in a pipe joint has a toroidal body with three circular grooves of concave profile centered on the body axis and separated by broad annular ribs of convex profile curved about its centerline.

2 Claims, 2 Drawing Figures

Patented Sept. 12, 1972
3,690,684
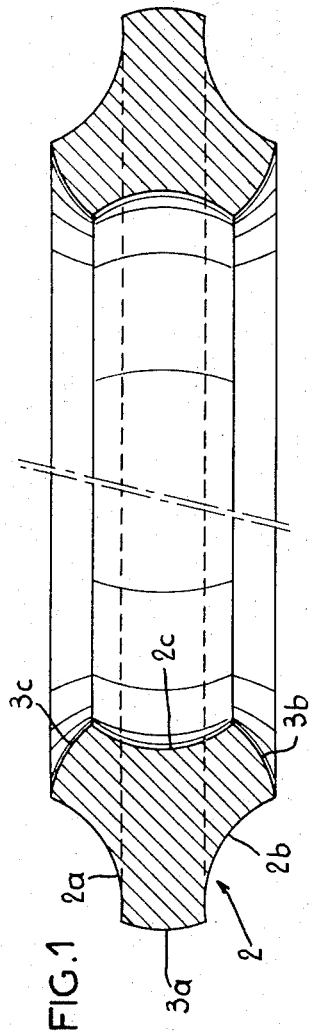
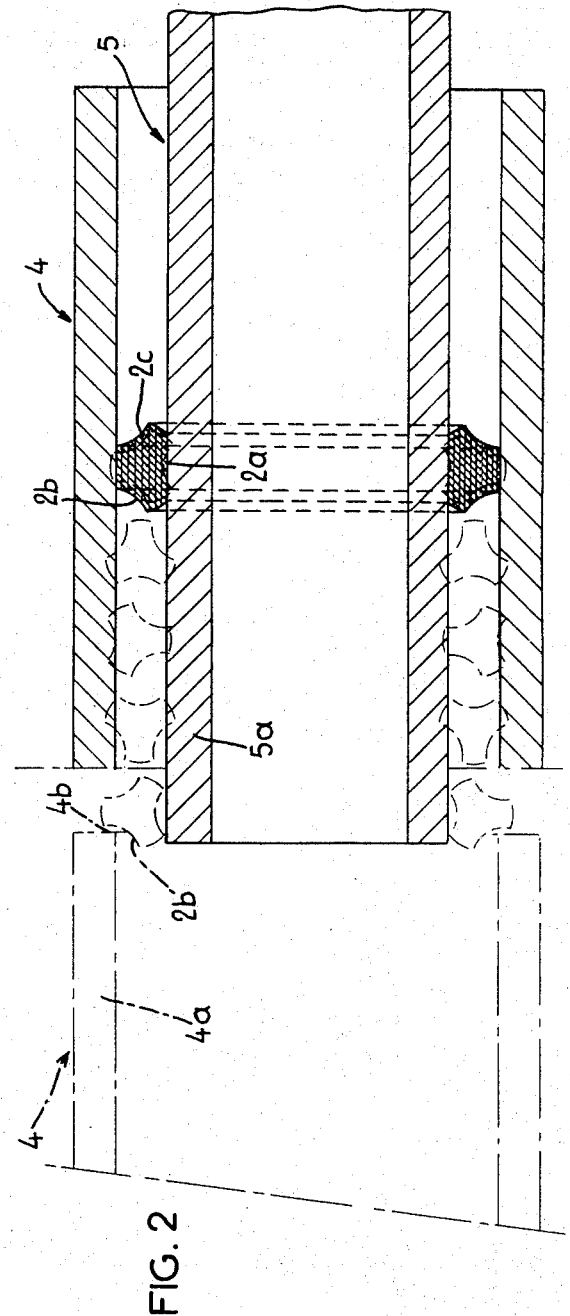
INVENTORS
René LANSAQUE
Georges BONNEFOND
BY *Karl G. Ross*
ATTORNEY 3,690,684

GASKETS

The present invention relates to an annular sealing gasket for tubes and pipes, and more particularly for joints between large-diameter tubes and pipes, such for example as those in main sewers and other drainage pipes.

The necessary fluidtightness at the junction of two such pipes is generally effected by rubber gaskets. At present, the gasket most generally used is an O-ring which is inexpensive and guarentees a tight joint. Nevertheless, such a ring does have disadvantages, particularly in the case where the male part of the pipe junction is more or less tapered. Indeed, in this case, the gasket tends to roll on the male pipe end to a position in which it is no longer pressed by that pipe against the female coupling flange surrounding same.

Moreover, this type of gasket does not ensure the relative immobilization of the pipes after their assembly. On the contrary, it often exerts an undesirable reverse force upon the pipe which has just been put into position.

In addition, at the time of mounting, the annular gasket, on account of its shape, does not assist the mutual alignment or interfitting of the two pipes since it slips under the thrust of the female pipe and thus provides no positive guidance.

Various other types of gaskets have been produced in order to remedy these disadvantages. However, these devices have never been able to combine, at one and the same time, reliable positioning of the gasket on the pipe body without rolling or escaping, relative immobilization of the pipes in the assembled position without yielding of one of them, easy alignment of the pipes, and good air-tightness.

This is why certain gaskets, in order to ensure simultaneously the immobilization of the pipes in the mounted position and good fluidtightness, comprise regions of extra thickness. Therefore, during mounting, it is necessary to exert considerable force in order to assemble the pipes, at the risk of causing rupture of the coupling flange.

In addition, the resulting excessive compression of the gasket may lead to a very early deterioration of the latter and to damage of the pipe flange within a fairly short period.

Moreover, taking into account the considerable weight of the pipes generally used, the deformation of these gaskets is very different in their upper and lower parts.

Thus, it is an object of the present invention to remedy these disadvantages, and for this purpose, according to the invention, we provide an annular gasket of flexible material where surface is formed with three coaxial circular grooves (e.g., an inner groove and two outer grooves) spaced 120° apart about the circular centerline of the gasket body.

Our improved gasket substantially retains the qualities of the conventional annular gasket O-ring, but does not have its disadvantages, by virtue of the presence of these three grooves, one of which always straddles the inner or male pipe termination or the surrounding flange or female termination and thus gives the gasket a firm seating on the pipe body, ensures relative immobilization of the assembled pipes, a substantially uniform compression of the gasket over all its parts, and a tight joint.

According to a preferred embodiment of the invention, the circular grooves have a profile of concave shape, facilitating the relative alignment of the pipes.

At the time of interengagement of the two pipes, the gasket is placed on the terminal portion of one of the pipes with one of its concave grooves confronting the peripheral surface of that pipe while another of its grooves faces the front edge of the second pipe which, during the assembly, is received in the latter groove, thus ensuring a proper rolling of the gasket about its centerline and the correct coaxial positioning of the two pipes.

An embodiment of the present invention will now be discribed, by way of example, with reference to the accompanying drawing in which:

FIG. 1 is a cross-sectional view, on a diametrical plane, of an annular gasket according to the invention; and FIG. 2 is a cross-sectional view, on a diametrical plane, showing the assembly of two pipes with interposition of the gasket.

FIG. 1 shows a gasket 2 according to the present invention. This gasket has an annular body of toroidal shape in which there have been cut three circular grooves 2a, 2b, and 2c, centered on the body axis, whose cross-section is in the form of a segment of a circle. These grooves 2a, 2b, 2c are spread apart 120° about the centerline of the gasket body and define between them three broad support surfaces 3a, 3b and 3c in the form of annular ribs of convex profile (curved about the centerline) spanning arcs somewhat smaller than those of the groove segments.

The assembly of this gasket 2 and with the pipes 4 and 5 into a fluidtight joint takes place in the following manner:

The gasket is fitted around the male termination of the joint, i.e., the front end 5a of the pipe 5, and is positioned in such a way that one of its grooves, here the inner groove 2a, confronts the outer surface of the pipe end 5a, as shown in the drawing.

The female end of pipe 4 is then moved toward the pipe 5 with the front edge 4b of the flange 4a thereof entering the groove 2b whose concave shape ensures, as will be seen, a correct adjustment of the pipes 4 and 5.

As will also be seen, the gasket 2 cannot slip during the interfitting motion, on account of its seating on the pipe end 5a at this instant, and consequently rolls over under thrust of the edge 4b of flange 4a.

As the gasket 2 rolls on the pipe end 5a, it is always in contact with the outer surface of pipe 5 and with the inner surface of the flange 4a by at least two of its support surfaces 3a, 3b, 3c as the successive position of the gasket shown in broken lines in FIG. 2 indicate.

In its final position, illustrated in continuous lines in FIG. 2, the gasket 2 is locked and ensures the relative immobilization of the pipes 4 and 5 without any risk of a backward movement of the pipe last put in place. Such a self-locking of the gasket occurs, during its rolling motion, once every 120°, i.e., a possible separating movement of the two pipes would in the most unfavorable case be limited to an arc length of about 60° of the gasket cross-section.

Moreover, this gasket 2 has a resistance to crushing which is comparable to that of a conventional annular gasket, that is to say, its compression is virtually uniform over its entire length, whatever its angular position.

We claim:

1. A sealing gasket for a pipe joint, comprising a toroidal body of flexible material formed with three circular grooves centered on the axis of said body and paralleling the centerline thereof, said grooves being angularly equispaced about said centerline and being separated by broad annular ribs of convex cross-section curved about said centerline.

2. A gasket as defined in claim 1 wherein said grooves are concave in cross-section and span arcs exceeding those spanned by the cross-sections of said ribs.

* * * * *